United States Patent [19]
Gaylord

[11] Patent Number: 5,797,042
[45] Date of Patent: Aug. 18, 1998

[54] METHOD AND APPARATUS FOR ADJUSTING THE BUFFERING CHARACTERISTIC IN THE PIPELINE OF A DATA TRANSFER SYSTEM

[75] Inventor: Jeremy Gaylord, Portland, Oreg.

[73] Assignee: Intel Corporation, Santa Clara, Calif.

[21] Appl. No.: 405,291

[22] Filed: Mar. 16, 1995

[51] Int. Cl.[6] ................................................ G06F 13/00
[52] U.S. Cl. .................................... 395/876; 395/200.63
[58] Field of Search ........................... 395/250, 200.01, 395/200.07, 200.08, 200.13, 876, 872, 200.63; 370/99, 100.1; 375/220, 221, 222, 317, 377

[56] References Cited

U.S. PATENT DOCUMENTS

| | | |
|---|---|---|
| 4,467,411 | 8/1984 | Fry et al. |
| 4,841,574 | 6/1989 | Pham et al. ............................ 395/250 |
| 5,038,277 | 8/1991 | Altman et al. ......................... 395/250 |
| 5,046,039 | 9/1991 | Ugajin et al. ......................... 395/876 |
| 5,093,912 | 3/1992 | Dong et al. ........................... 364/230 |
| 5,179,662 | 1/1993 | Corrigan et al. ....................... 395/250 |
| 5,214,759 | 5/1993 | Yamaoka et al. ..................... 395/200.08 |
| 5,278,956 | 1/1994 | Thomsen et al. ...................... 395/250 |
| 5,299,315 | 3/1994 | Chin et al. ............................ 395/250 |
| 5,365,552 | 11/1994 | Astle ................................... 375/377 |
| 5,412,780 | 5/1995 | Rushton ............................... 395/250 |
| 5,450,530 | 9/1995 | Synder et al. ......................... 375/220 |
| 5,471,581 | 11/1995 | Munier et al. ........................ 395/250 |
| 5,493,609 | 2/1996 | Winseck, Jr. et al. .................. 375/222 |
| 5,524,214 | 6/1996 | Kurihara .............................. 395/876 |
| 5,640,604 | 6/1997 | Hirano ................................ 395/876 |

*Primary Examiner*—William M. Treat
*Assistant Examiner*—Patrice L. Winder
*Attorney, Agent, or Firm*—Blakely, Sokoloff, Taylor & Zafman

[57] ABSTRACT

A data transfer system dynamically reconfigures the buffering characteristic of the data transfer system at each request for access to the transfer pipe. The data transfer system determines the mode in which the system is operating and configures the buffers appropriately. Data flows into the pipe. The buffer identifies fill level of each buffer and the number of free buffers remaining available. Based on this information, the system dynamically reconfigures the buffering characteristic to provide improved performance characteristics during the data transfer.

13 Claims, 5 Drawing Sheets

METHOD AND APPARATUS FOR ADJUSTING THE BUFFERING CHARACTERISTIC IN THE PIPELINE OF A DATA TRANSFER SYSTEM

BACKGROUND OF THE INVENTION

1. Field of the Invention

This invention relates to buffering characteristics of data transfer systems. More specifically, the invention relates to dynamic adjustment of the buffering characteristic in data transfer systems.

2. Related Art

It is common practice in data transfer systems to employ a pipeline of buffers on a communication line between data terminal equipment (DTE) and data connection equipment (DCE) as a holding area to hold data awaiting its turn to be transferred out along the line. The same pipeline is employed to hold data coming from the DCE awaiting its turn to be transferred to the DTE. The pipeline consists of free buffers and full buffers with the data following a first in-first out (FIFO) transmission scheme. At initialization, all buffers are free. As the buffers are filled, they cycle through to transmit out with free buffers being cycled back to be filled. This cycling is performed by passing pointers corresponding to free and full buffers. When the fill rate is faster than the rate at which data can be transferred, eventually all buffers will be full and the rate of fill will need to be reduced to fill only as fast as buffers are emptied. Alternatively, if the fill rate is slower than rate of transfer, partially filled buffers will be transferred. Where the number of buffers is small, a blocking state may result when the filling end of the pipeline runs out of buffers because the buffers have not had time to cycle back, so no buffers are available to accept data. When no buffers are available, the routine filling the buffers must be suspended (i.e. "blocked") until more buffers cycle back. This creates latency in the data transfer.

Common data transfer systems employ the static buffering characteristic designed to maximize throughput in the case of file transfers wherein large blocks of data are being transferred with only minimal latency constraints and minimal real time constraints. For this type of transfer, an optimal buffering characteristic is a large number of large buffers, thus allowing the large blocks of data to be buffered in preparation for transfer, thereby allowing the processor to execute other tasks while waiting for the data to transfer out. However, this buffering characteristic is not optimal for "chatting" on-line. Chatting is where the users are transmitting messages back and forth which are being transmitted from the keyboard. Thus, chatting takes place at normal typing speeds requiring low throughput, but also low latency to maintain the desired interactive feel. The optimal characteristic for chatting is a large number of small buffers. This characteristic reduces latency because it is less likely to run out of buffers, and normal typing speed will not fill larger buffers to any significant extent. Since all real systems suffer a constraint on the size of memory available, the number of buffers of a given size which may be used is limited. Thus, a trade-off exists between a large number of small buffers (ideal for chatting) and a smaller number of large buffers (ideal for file transfer). Since data transfer systems are typically rated based on throughput of file transfers, the desirable buffer characteristics for chatting have gone largely ignored.

Many newer modems offer both data mode, in which either file transfer or chatting can be performed, and voice mode whereby voice data are transmitted through the communication pipeline. In voice mode modems suffer both significant real time and latency constraints. Therefore, an optimal buffering characteristic for voice mode transmissions has a medium number of medium-size buffers. As discussed above, system designers typically optimize for file transfer and ignore the needs of voice transmissions.

As the number of modes in which data transmit systems operate increase, the frailties of the static buffering characteristic become increasingly problematic. It is, therefore, desirable to develop a system whereby buffering characteristics of the data transfer pipe can be dynamically adjusted in accordance with the data to be transferred.

SUMMARY OF THE INVENTION

No single buffering characteristic is desirable for all types and modes of data transfer. The present invention improves the performance of a data transfer system by monitoring the system mode and adjusting the buffering characteristic to one desirable for that mode. The monitor then further monitors the fill level of each buffer, as well as the number of free buffers in the system at any time. In so doing, it is able to determine whether it is desirable to increase or decrease the size or number of the buffers. Where a size change is desirable based on the data being transferred, the invention automatically dynamically re-adjusts the buffering characteristic of the transfer pipes. By repeatedly checking the fill level and number of buffers used and reconfiguring the buffering characteristic, accordingly, the system is able by iteration to optimize the buffering characteristic for the data being transferred.

This system provides significant benefits over the prior art wherein a static buffering characteristic was required to handle all modes and data transmission types. By adjusting the buffering characteristic, the instant invention is able to reduce latency and appropriately adjust for the real time constraints posed by voice-data transmissions. Further, the system is readily expandable to accommodate subsequently developed modes of operation requiring buffering characteristics different from those in common use today.

BRIEF DESCRIPTION OF THE DRAWINGS

The objects, features, and advantages of the present invention will be apparent to one skilled in the art in light of the following detailed description in which.

DETAILED DESCRIPTION OF THE INVENTION

The present invention teaches a system and method for dynamically reconfiguring buffers in the pipeline of a data transfer system. In the following description, numerous specific details are set forth in order to provide a thorough understanding of the present invention. It should be clear to one of ordinary skill in the art that the present invention may be practiced without using these specific details. In other instances, well known methods and structures have not been described in detail so as not to unnecessarily obscure the present invention. References to modems in this description are merely exemplary of one type of data transfer system, however, it will be readily recognized that the teachings of this invention are equally applicable to other data transfer systems.

Figure 1:
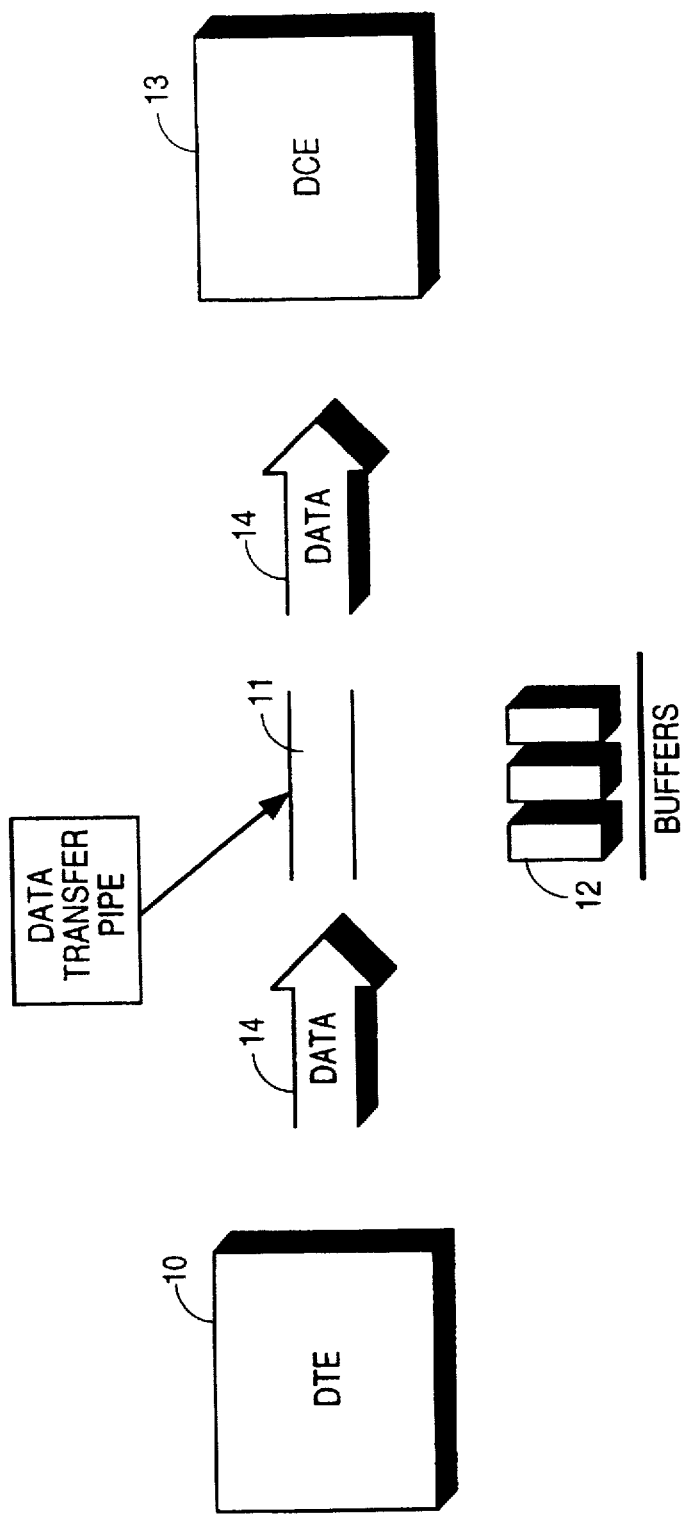
FIG. 1 is a block diagram of a common data transfer system.

FIG. 1 shows a block diagram of common prior art data transfer system which is a standard modem. FIG. 1 shows a flow of data 14 through a data transfer pipeline 11 composed of buffers 12 from data terminal equipment 10 to data connection equipment 13. The buffers 12 in this prior art system are a fixed size and fixed number based on the pre-established buffering characteristic of the data transfer pipe 11. For the sake of simplicity, this diagram only shows data flowing in one direction. As a practical matter, all real systems support bi-directional data flow. Thus, in prior art systems, it is also commonly the case that data 14 flows from the DCE 13 to the DTE 10 through the data transfer pipe 11.

Figure 2:
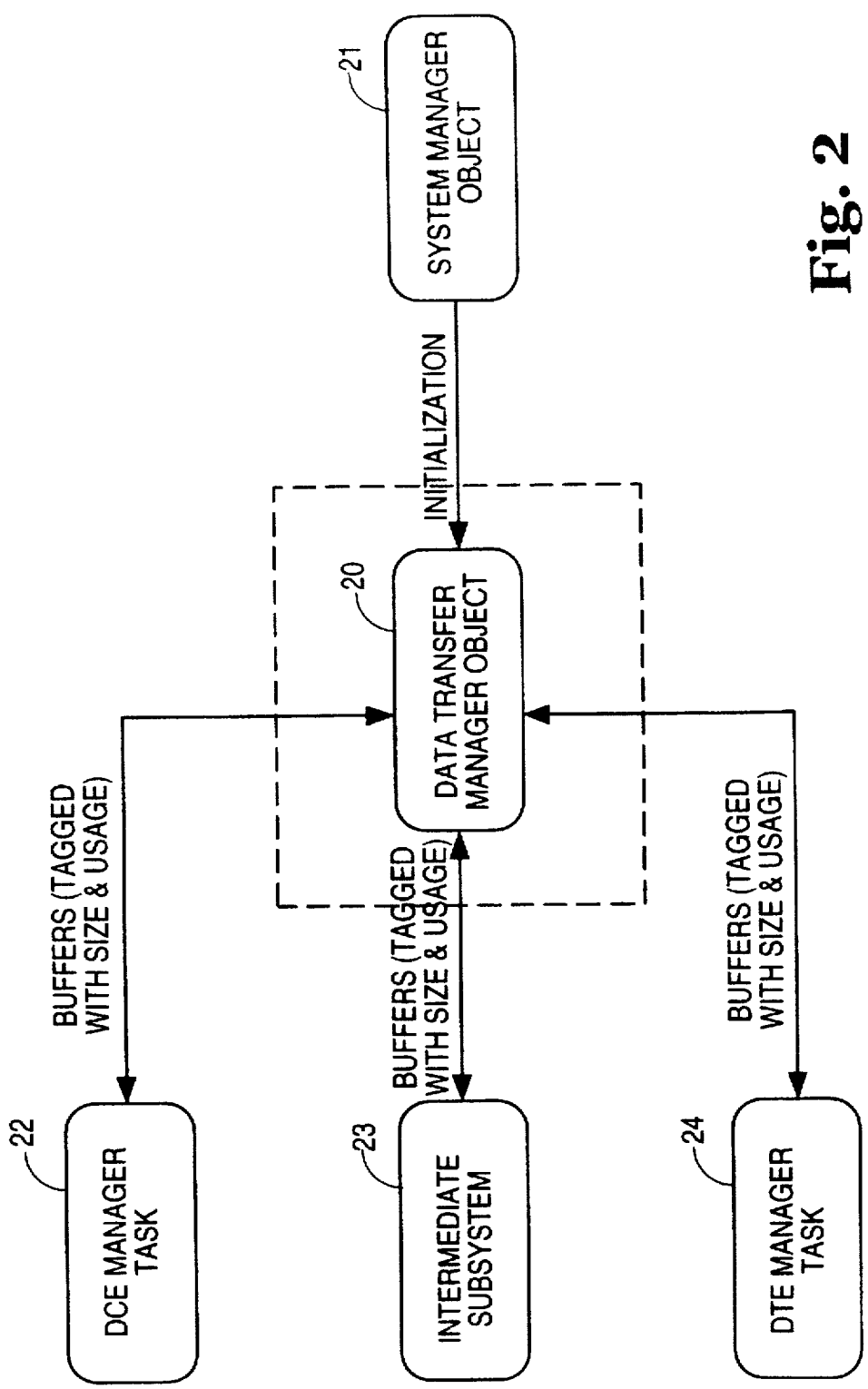
FIG. 2 is a block diagram showing the instant invention's relation to prior art objects.

FIG. 2 shows a block diagram including the Data Transfer Manager Object (DTM) 20 of the present invention and its relationship between the DCE manager task 22, intermediate subsystem 23, DTE manager task 24 and the system manager object 21. The invention implements the DTM 20 in a microprocessor. The DTM 20 accepts buffers from DCE manager task 22, intermediate subsystem 23, or the DTE manager task 24; tracks buffer size and usage and forwards it appropriately through a data transfer pipe. In the exemplary transfer, buffers might be passed from the DTE manager task 24 to the data transfer manager object 20 which would then pass the buffers to the intermediate subsystem 23 which, for example, might perform data compression. The intermediate subsystem 23 would then pass the same buffers back to the data transfer manager object 20 which would pass the buffers onto the DCE manager task 22. Throughout this process, the data transfer manager object would track buffer usage and system mode, and appropriately adjust the buffering characteristic of the transfer pipe.

Figure 3:
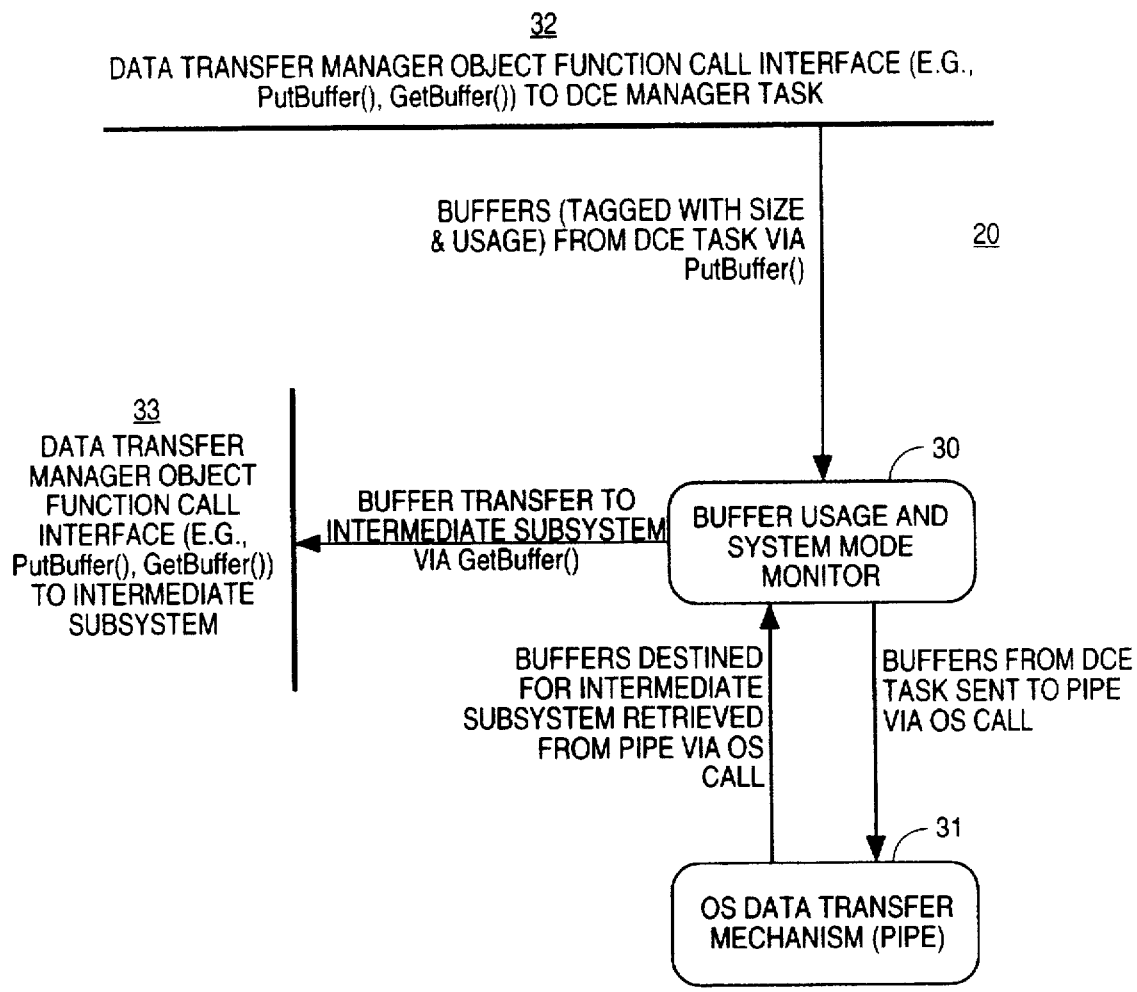
FIG. 3 is a block diagram exemplifying a single data transfer using the instant invention.

FIG. 3 shows a block diagram of a single transfer within the DTM 20. The DTM 20 contains a buffer usage and systems mode monitor 30, and it encapsulates the transfer pipe 31 such that the DCE manager task 22, DTE manager task 24, and intermediate subsystem 23 cannot directly access the pipe 31. Rather the buffer usage and system mode monitor orchestrates access to the pipe 31. The buffer usage and system mode monitor 30 monitors the historical buffer usage and the system mode reconfiguring the buffers for optimal performance based on these criteria. By requiring the source tag, the buffers, size and usage can be easily monitored by checking the tag. Other methods of monitoring buffer size and usage will be recognized by those skilled in the art and as such, are contemplated as being within the scope and spirit of the invention. Thus, if data usage reflects chat data mode, i.e. data mode with low buffer usage, the monitor 30 will reflect this and the DTM 20 will adjust to the appropriated buffer configuration.

An exemplary transfer is shown in FIG. 3. The DCE interface 32 fills buffers and passes them to the buffer usage and systems mode monitor 30. The pipe 31 is created by an OS call. Parameters of the described buffering characteristic are passed to the OS which then creates a pipe with the specified parameters. Once the pipe is configured, the monitor 30 forwards the buffers into the pipe 31 and retrieves the buffers from the pipe responsive to a request from the interface to the intermediate subsystem interface 33 to which the retrieved buffers are then forwarded. Possible intermediate subsystems 23 include error correction, data compression, and command line parsing. These possible subsystems are listed merely by way of example and are not intended to be an exhaustive list. It would be readily understood by those of ordinary skill in the art what constitutes an intermediate subsystem 23.

Figure 4:
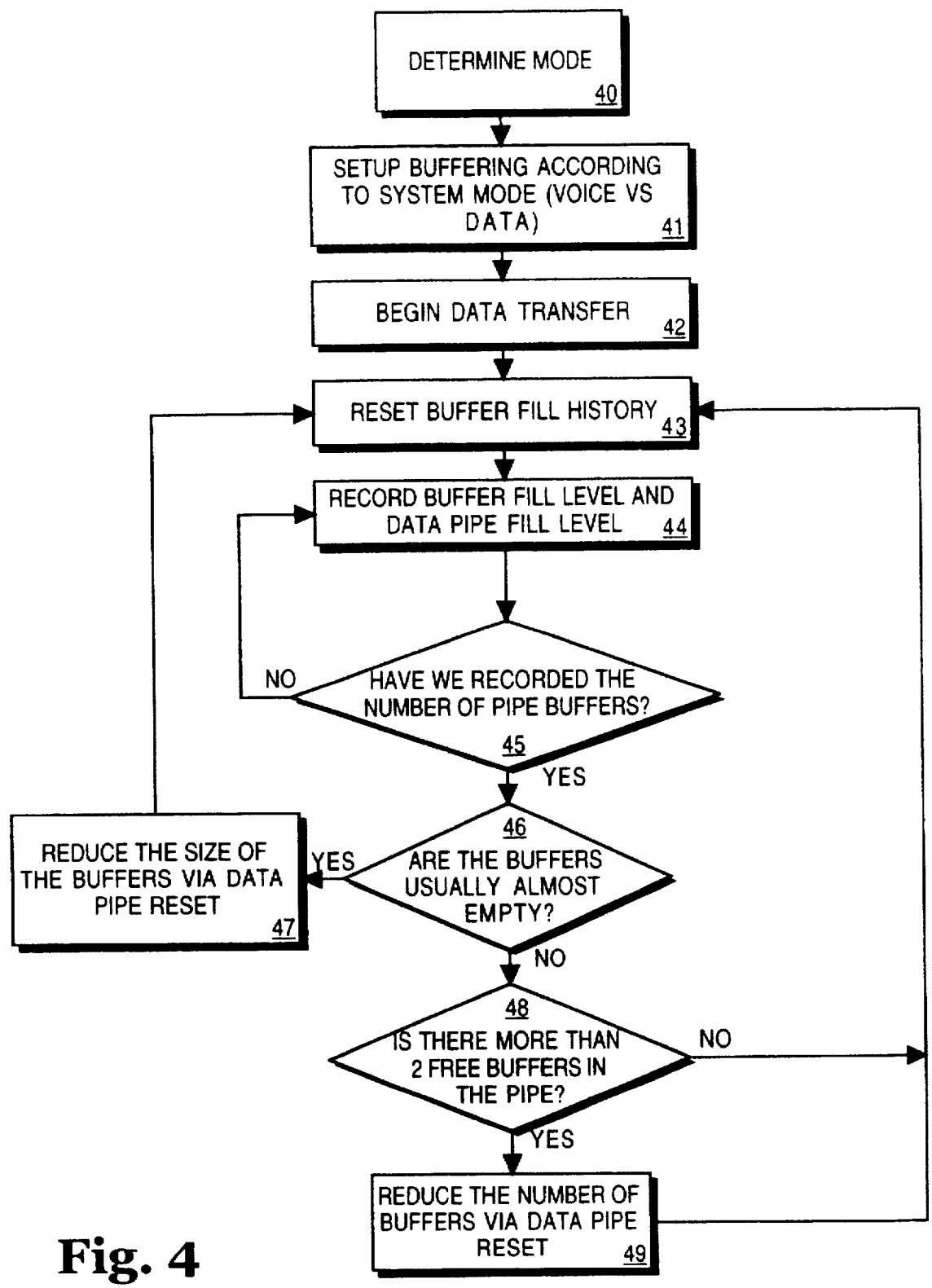
FIG. 4 is a flowchart indicating the flow of operations during a data transfer employing the instant invention.

FIG. 4 is a flowchart showing the process through which the buffer usage and system mode monitor 30 determines how the data transfer manager object 20 should configure the buffers. First, the monitor 30 must determine the system mode 40. Mode determination can be easily performed since the modem must know in what mode it operates. Therefore, simply checking what mode the modem believes it is in will provide the information necessary for initial set-up 41 of the buffering characteristic based on system mode. The mode should be rechecked each time an interface requests a buffer put in the pipe or returned from the pipe. If the mode is not the same as during the previous request, the buffers should be automatically reconfigured for the new mode.

Once the initial set-up is accomplished, the system begins data transfer 42 by opening the pipe. At this stage, buffer fill history is reset 43, and a new record of buffer fill level and data pipe fill level 44 is established. A check is then made that the number of buffers in the pipe has been recorded 45. Once we have recorded the number of buffers in the pipe, it is determined whether the buffers are usually almost empty 46. What constitutes "almost empty" for purposes of this step may vary from one implementation to the next depending on the overhead required for each buffer transfer and the savings accomplished by reducing buffer size. Low usage is typically reflective of chat mode. If the buffers are usually almost empty, it is desirable to reduce the size of the buffers in the data pipe 47. This is performed by resetting the pipe.

A pipe reset entails emptying the pipe of buffers without allowing additional data to enter the pipe, closing the pipe, reconfiguring buffers in the pipe to adjust the buffer size by recreating the pipe through an OS call, and reopening the pipe for data flow. If the buffers are usually substantially used, a check is made to determine if there are more than two free buffers in the pipe 48. If there are, it is desirable to reduce the number of buffers by resetting the pipe and reconfiguring the buffering characteristic to have fewer longer buffers. It will be recognized by those skilled in the art that the selection of two free buffers as the reconfiguration point is not essential to the invention. Thus, other numbers of empty buffers might be selected as the reconfiguration trigger without departing from the spirit or scope of the invention. After reconfiguration 47 or 49, or a negative response to the check of free buffers 48, the buffer history is reset 43, and the process is repeated. Significantly, the entire reconfiguration is performed automatically requiring no user intervention.

Figure 5:
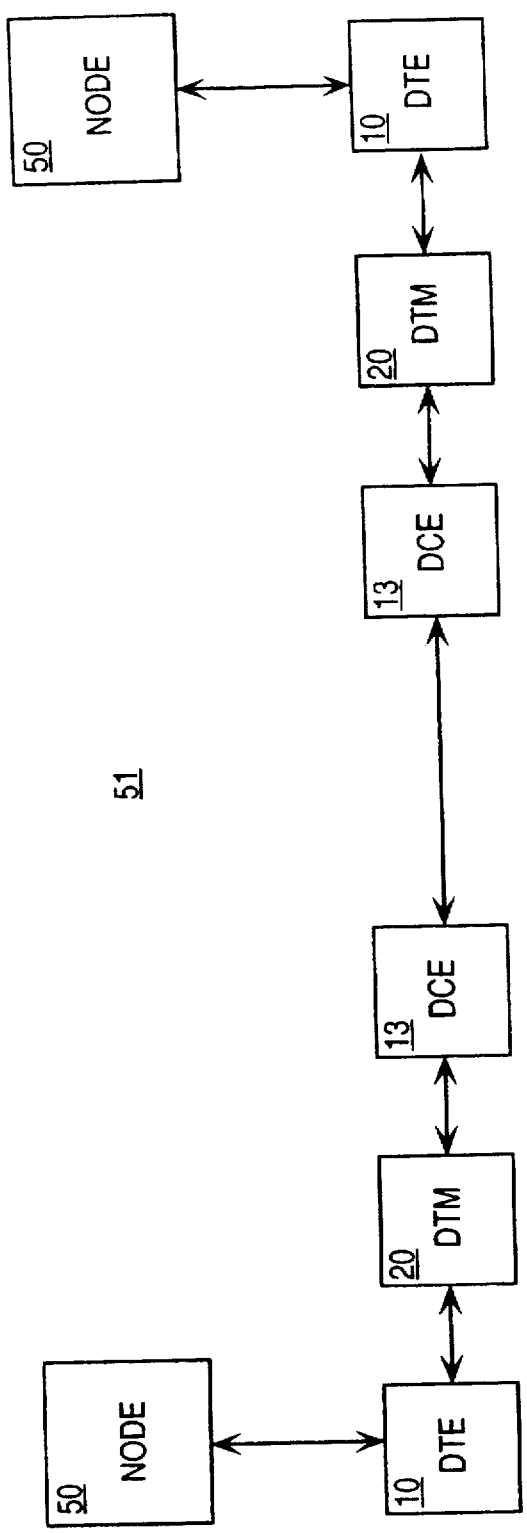
FIG. 5 is a block diagram showing the instant invention's implementation in a multinode network.

FIG. 5 shows a block diagram of the invention incorporated into a network 51. For the sake of simplicity, only two nodes 50 are shown. It would be readily understood by those of ordinary skill in the art that this connection scheme is applicable to any number of nodes 50. It will also be understood that use of the invention by one node 50 in a network 51 will not necessitate its use by other nodes 50 in the network 51. A node 50 is connected to a DTE 10 which is coupled to a DCE 13 through a DTM 20. The DCE 13 is further coupled to DCEs 13 corresponding to other nodes 50 in the network 51. The DTM 20 encapsulates the pipe (not shown) and configures the pipe based on system mode and buffer usage.

The specific arrangements herein are merely illustrative of several applications of principles of this invention. Numerous modifications in form and detail may be made by those skilled in the art, without departing from the true spirit and scope of the invention. Thus, although this invention has been shown in relation to particular embodiments, it should not be considered so limited. Rather, it is limited only by the appended claims.

What is claimed is:

1. In a data transfer system having a plurality of buffers, a method of dynamically changing a buffering characteristic of a system comprising the steps of:

detecting a mode in which the system is operating;

configuring the buffering characteristic based on the mode;

determining buffer usage including a number of buffers used and a usual fill for the buffers used;

further configuring the buffering characteristic based on usage; and wherein configuring includes preventing data from entering the buffers; emptying the buffers of any residual data; changing a size and a number of buffers and allowing data to enter the reconfigured buffers.

2. The method of claim 1 further comprises the steps of:

tagging the buffers with size and usage, and storing a current size of the buffers.

3. The method of claim 1 wherein the mode detected is one of voice mode and data mode.

4. The method of claim 1 wherein detecting a mode is performed in response to each request for access to the buffers.

5. The method of claim 1 wherein the data transfer system is a modem.

6. A data transfer system comprising:

a pipeline of buffers having a buffering characteristic; and means for dynamically and automatically adjusting the buffering characteristic responsive to data flow in the pipeline.

7. The data transfer system of claim 6 wherein the pipeline can be configured along the continuum of a single buffer filling the entire pipeline to bit sized buffers filling the pipeline.

8. A data transfer system comprising:

a pipeline of buffers having a buffering characteristic;

means for determining in which mode the system is operating; and means for configuring the buffering characteristic based on mode, the means for configuring including means for preventing data from entering the pipeline; means for emptying the pipeline; means for adjusting the size of the buffers in the emptied pipeline; and means for restoring the flow of data into the pipeline.

9. The data transfer system of claim 8 wherein the buffers are tagged with size and usage.

10. A data transfer system: comprising a pipeline of buffers having a buffering characteristic;

means for determining buffer usage; and means for configuring the buffering characteristic based on buffer usage, the means for configuring including means for preventing data from entering the pipeline; means for emptying the pipeline; means for adjusting the size of the buffers in the emptied pipeline; and means for restoring the flow of data into the pipeline.

11. The data transfer system of claim 10 wherein the means for determining buffer usage determines usual fill of buffers transferred and a number of empty buffers in the pipeline.

12. A computer network comprising:

a plurality of nodes capable of internode communications; and a data transfer system for passing data between the nodes comprising a plurality of dynamically reconfigurable buffers and means for dynamically reconfiguring the buffers, the means for dynamically reconfiguring including means for determining one of system mode and buffer usage and a means for configuring the buffers based on one of system mode and buffer usage.

13. The computer network of claim 12 wherein the buffer size and number can be changed along a continuum from a single buffer to multiple bit size buffers occupying equal space.

* * * * *